United States Patent [19]

Loach et al.

[11] 4,040,820
[45] Aug. 9, 1977

[54] PROCESSING ALUMINUM SKIM

[75] Inventors: James A. Loach, Vienna; Harold R. Kirby, Ripley, both of W. Va.

[73] Assignee: Kaiser Aluminum & Chemical Corporation, Oakland, Calif.

[21] Appl. No.: 656,690

[22] Filed: Feb. 9, 1976

[51] Int. Cl.$^2$ .............................................. C22B 7/04
[52] U.S. Cl. ...................................... 75/68 R; 75/24
[58] Field of Search ..................................... 75/24, 68

[56] References Cited

U.S. PATENT DOCUMENTS

| 2,754,199 | 7/1956 | Stroup | 75/24 |
| 3,043,678 | 7/1962 | Lowry | 75/24 |
| 3,155,494 | 11/1964 | Heins | 75/24 |
| 3,393,975 | 7/1968 | Mitchell | 75/24 |
| 3,660,076 | 5/1972 | Williams | 75/24 |
| 3,770,424 | 11/1973 | Floyd | 75/24 |

Primary Examiner—Peter D. Rosenberg
Attorney, Agent, or Firm—Paul E. Calrow; Edward J. Lynch

[57] ABSTRACT

The invention relates to an efficient, salt-free method of recovering metallic aluminum from furnace skim wherein the skim is tumbled for a short period in a rotary furnace at a temperature between 1200° and 1500° F (649°–816° C) to separate the molten aluminum from the oxide portion of the skim. Preferably, after molten aluminum is drained from the rotary furnace, the spent skim is rapidly cooled by adding a relatively cool pebbly or granular material to facilitate the discharge and disposal thereof.

12 Claims, 4 Drawing Figures

… …

PROCESSING ALUMINUM SKIM

BACKGROUND OF THE INVENTION

This invention relates to the recovery of free metal entrained in the skim or dross which forms on the surface of molten aluminum during melting, holding or treatment.

It is well known that during the processing of molten aluminum, a layer of nonmetallic impurities (primarily oxides) forms on the surface of the molten aluminum and that much metallic aluminum can be entrained in this layer. Under conventional practice, the skim or dross is removed from the melt surface by mechanical means, such as long hand-held rakes or other implements. When the skim is removed from a furnace, it usually has a free metal content from about 40-85%. The metallic content of the skim depends on many factors, including the alloy composition, if the metal has been degassed and if so, how, and the care exercised by the operator in removing the skim from the melt surface. Wide variations in metal content are common.

If the skim is allowed to stand in a suitable container for a short period of time after it is removed from the melt surface, some molten aluminum will settle to the bottom of the container and can be decanted back into the furnace or poured into a mold. However, much metallic aluminum remains intimately mixed within the skim in the form of small globules or particles which will not readily separate from the mass of skim.

Due to the high skim temperature when the skim is removed from the molten aluminum surface, the molten aluminum in the skim mass frequently begins to rapidly oxidize (commonly termed thermiting), consuming a considerable amount of the free metal in the dross. A frequently used rule of thumb is that 1% of the molten aluminum in hot skim is oxidized for every minute the skim is exposed to the atmosphere. If allowed to continue, essentially all of the molten aluminum in the skim would be consumed.

Several methods have been used in the past to reclaim the free aluminum entrained in the skim. One method has been to rapidly cool the skim (to avoid oxidation of the free metal), grind the skim in a ball mill (or other suitable device) and then separate the ground material into a coarse (metallic) fraction and a fine (nonmetallic) fraction. This method is simple and inexpensive, but the overall metal recovery is usually very poor. A second method has been to mix the skim into a molten salt bath which frequently contained fluorides. The molten salt causes the coalescence of the molten aluminum globules in the skim and the separation of the molten metal from the oxide portion of the skim. Although a very high metal recovery is obtained, the salts used in this process are expensive and present environmental pollution laws make the disposal of the spent salts difficult. A third method involved mixing or agitating the hot skim in some manner, such as with a mixing blade or paddle, to mechanically separate the molten aluminum from the hot skim. However, the mixing or beating action of the blade was not very efficient in causing the coalescence of the molten aluminum globules and, moreover, it entrained much oxide into the molten aluminum which did coalesce. Generally, temperature control in such devices was difficult. Moreover, installations having such mechanical devices have been usually limited to treating small quantities of skim and are of little value in handling the volume of skim generated at large aluminum plants.

A modification of the above third method is described in U.S. Pat. No. 2,481,591 (Hellman et al) wherein the hot skim is tumbled in a rotating furnace to cause a partial oxidation of the molten metal therein. It is alleged by the patentees that the extremely high temperature (1550°-2300° F) generated by the oxidizing free metal in the skim caused a breakdown between the oxide and the free metal and resulted in a good separation between the metal and the oxide during the tumbling of the skim in the rotary furnace. Although good metal recoveries are alleged, it has been found that much metal is consumed to generate the extremely high temperatures required by this process and, further, the process was fraught with operational problems. For example, at skim temperatures above 1500° F, the oxidation of molten aluminum is very difficult to control due to the rapid and highly exothermic nature of the oxidation reaction. Such uncontrolled oxidation generates temperatures in excess of 3000° F which can result in the early destruction of the refractory lining and even the destruction of the furnace itself. Additionally, the high temperatures cause an oxide build-up on the furnace lining which interferes with the tumbling of the skim and the discharge of molten aluminum and spent skim from the furnace. The build-up apparently results from the sintering of oxides to the refractory lining of the furnace. Excessively high temperatures are also characterized by the generation of copious amounts of dust which considerably increase the capital costs for dust collection equipment. Another problem often encountered with this high temperature process is the formation of large sintered masses of spent skim in the rotary furnace which are difficult to discharge because of their size and, when removed from the furnace, are difficult to handle and dispose of.

To minimize some of the problems attendant with the process described by Hellman et al in U.S. Pat. No. 2,481,591, it has been suggested by Stroup et al in U.S. Pat. No. 2,754,199 to maintain an $AlCl_3$ atmosphere over the tumbling mass of skim to prevent excessive skim temperatues. However, the addition of chlorine (or other halide) to the rotary furnace is not desirable due to the expense and trouble of treating an effluent containing a chloride (or other halide) gas or mist. The $AlCl_3$ formed by the chlorine quickly reacts with any moisture present in the atmosphere to form HCl and a submicroscopic particulate $Al_2O_3$ which are very difficult to capture by conventional means. Use of a sealed furnace would avoid many of the problems of processing the skim in a halide containing gas but a sealed rotary furnace for large industrial applications would be impractical in most instances.

It is against this background that the present invention was developed.

DESCRIPTION OF THE INVENTION

Figure 1:
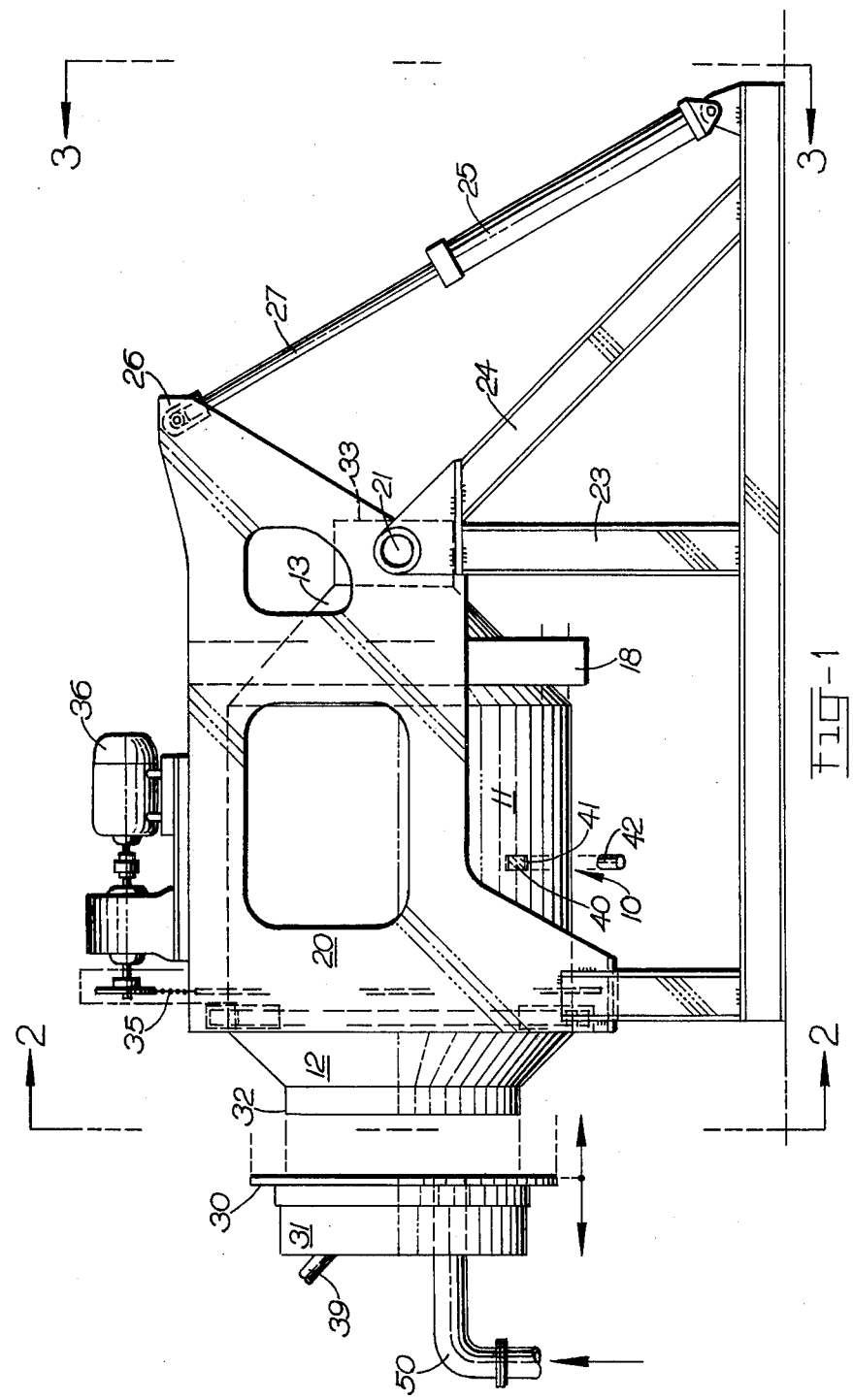
FIG. 1 is a side elevational view of the furnace useful in the operation of the invention.

The invention relates to an essentially salt-free treatment of skim or dross removed from a molten aluminum surface to recover the aluminum entrained therein. In general, the treatment of the invention comprises tumbling the metal containing skim in a refractory-lined rotary furnace while maintaining the skim temperature between about 1200°–1500° F (649°–816° C). The atmosphere in the furnace chamber is oxidizing in nature and contains essentially no halides. Excellent recovery of free metal from the skim is provided by the process, and, moreover, the spent skim needs no further treatment for disposal.

In accordance with the invention, the skim or dross is removed from the surface of the molten aluminum and preferably placed in a crucible (commonly called a skim bucket) or other suitable container wherein some of the molten aluminum settles to the bottom of the crucible. The molten metal which settles can be decanted back into the furnace or poured into a mold for subsequent remelting. The skim remaining in the crucible, which still contains considerable quantities of free molten aluminum, is transferred to a rotary furnace wherein the skim is caused to be tumbled in an essentially halide-free atmosphere for a short period at a temperature above 1200° F but less than 1500° F.

The molten aluminum in the gently tumbling hot skim readily coalesces and rapidly settles to the bottom of the rotating furnace. To avoid excessive oxidation of the metal while being tumbled in the rotating furnace, the temperature of the skim mass is controlled between about 1200° and 1500° F (649°–816° C), preferably about 1200°–1350° C). By controlling the temperature of the skim mass within the specified range of the invention, there is essentially little or no sintered build-up on the refractory lining of the furnace and there is little or no detrimental effect on the refractory lining. Due to the gentle tumbling action on the skim in the rotary furnace, molten aluminum entrained in the skim readily separates from the oxide portion and total metal recovery can exceed 80% of the free aluminum in the original skim weight. The tumbling action of the skim in the rotary furnace is best described as cascading because generally the skim rolls from the top of the skim mass to the bottom of the rotary furnace. This is to be constrasted with cataracting which connotes that the material is projected through the air to the bottom of the rotary furnace. See Section 8.22, Perry's Chemical Engineering Handbook, 4th Edition. Severe agitation of the skim is not desired. Depending upon furnace size, rotation can range from 1–30 revolutions per minute. The tumbling period within the rotating furnace for the metal containing skim should range from about 1–20 minutes, preferably from about 1–10 minutes, and at the end of the tumbling period, the molten aluminum is drained from the furnace as quickly as possible.

The spent skim is preferably quickly cooled to below 1200° F and then discharged from the rotary furnace. The cooling can be conveniently accomplished by adding a cool pebbly or granular material to the furnace and then rotating the furnace to intermix the granular material into the skim and thereby cool same. The pebbly or granular material must not melt at the temperature of the skim nor react significantly therewith. Furnace rotation is continued for about 1–15 minutes to safely cool the skim and facilitate the handling thereof and to help keep the refractory lining in the rotary furnace free from build-up. If the temperature of the spent skim is not quickly reduced, the spent skim in the furnace has a tendency to form large sintered masses which makes handling and disposal of the spent skim difficult. Generally the temperature of the spent skim is reduced to that of red heat (about 1100° F or 593° C), preferably less than 1000° F or 538° C. Although usually the granular material will be at atmospheric temperature, the temperature of the material can be at much higher or lower temperatures so long as the granular material quickly cools the spent skim to the desired level. The nature of the granular material is immaterial, provided the material neither melts at the operating temperatures nor significantly reacts with the skim or any metal contained therein. Suitable materials include gravel, limestone, ferro slag, alumina and the like. Even spent skim can be employed if desired. The material should be dry and generally range in size from +14 mesh to −2 inches maximum particle diameter with preferably at least 50% of the granular material being $\frac{3}{8}$–$\frac{3}{4}$ (0.95–1.9 cm) in maximum dimension.

The spent skim is essentially metal free (i.e., less than 10% free metal) and is an innocuous material which is suitable for land fill essentially as-is. No further treatment is necessary to meet present environmental regulations other than the normal preparation of land fill to meet local or state regulations.

The entire treatment time in accordance with the invention preferably should not exceed 30 minutes from the time the skim is first removed from the melting or holding furnace until the essentially metal-free skim is discharged from the rotary furnace. However, if the skim temperature is allowed to drop below the melting temperature of the aluminum in the skim, the entire treatment times will be longer and metal recoveries will be less due to the necessity of reheating the skim to the operating temperature. The short furnace turn-around time allowed by the invention significantly reduces the time the hot skim is exposed to the atmosphere and thereby reduces metal oxidation and provides increased metal recovery.

Skim temperatures above 1500° F (816° C) are to be avoided for several reasons. First, at such high temperatures, molten aluminum can rapidly oxidize and thereby significantly reduce metal recovery. Moreover, at the high temperatures, the control frequently is unstable because the exothermic oxidation of metal is self-perpetuating and results in rapidly rising temperatures which locally can reach or exceed 3000° F (1649° C). Such high temperatures can accelerate the deterioration of the refractory lining and result in the destruction of the furnace itself. This is particularly noticeable with aluminum alloys containing more than 1% magnesium. Additionally, the build-up of sintered oxide products on the refractory lining and the agglomeration of the spent skim appear to be intensified by excessively high temperatures.

The temperature of the skim within the rotary furnace can be maintained in the desired range by any suitable means. The lower temperature can be readily controlled by operating a burner at one end of the furnace. The upper temperature may be more difficult to control at times due to localized rapid oxidation of molten aluminum. However, by controlling the amount of combustion supporting gas within the furnace, the burning of the molten aluminum can be limited and the desired temperature maintained. Another convenient method of controlling the maximum temperature is adding an inert (to the molten aluminum) solid quenchant, such as ordinary gravel, tabular or granular alumina and the like. However, the quenchant material should be well dried before being fed to the furnace to avoid the dangers of an explosion from moisture. Filling the furnace interior with chlorine or a chloride-containing gas to control the temperature complicates the process too much to be of any value due to required gas cleaning equipment and the corrosive nature of the gas and its reaction products.

One method of sensing the temperature of the skim in the furnace is to position an anisotropic, pyrolytic graphite brick in the refractory lining at one or more positions within the furnace lining with part of the metallic furnace shell immediately backing the graphite brick removed to allow an infrared pyrometer positioned adjacent the rotary furnace to sense the temperature of the exposed surface of the graphite block each time the furnace is rotated. The temperature sensed can be directly correlated with the inside wall temperature and does not vary far (usually less than 25° F) from the mean temperature of the skim mass. Other methods include pyrometrically sensing the temperature through a port in one end of the furnace.

Even when the temperature of the hot skim is maintained within the desired range of the invention, hot spots, i.e., localized rapid oxidation of aluminum, occasionally develop which can cause a sintered build-up on the furnace lining. The effects of such hot spots can be minimized by coating the inside furnace lining with a high temperature (e.g., MP 1950° F) glassy frit such as that described in U.S. Pat. No. 2,997,402 (assigned to the present assignee) which is resistant to molten aluminum. Although various types of refractory brick can be used to line the rotary furnace, phosphate-bonded, high alumina (70%) brick have been found to be most satisfactory. A particularly suitable phosphate-bonded, high alumina brick is Alumex® P-7 manufactured and sold by the present assignee.

Figures 2, 3:
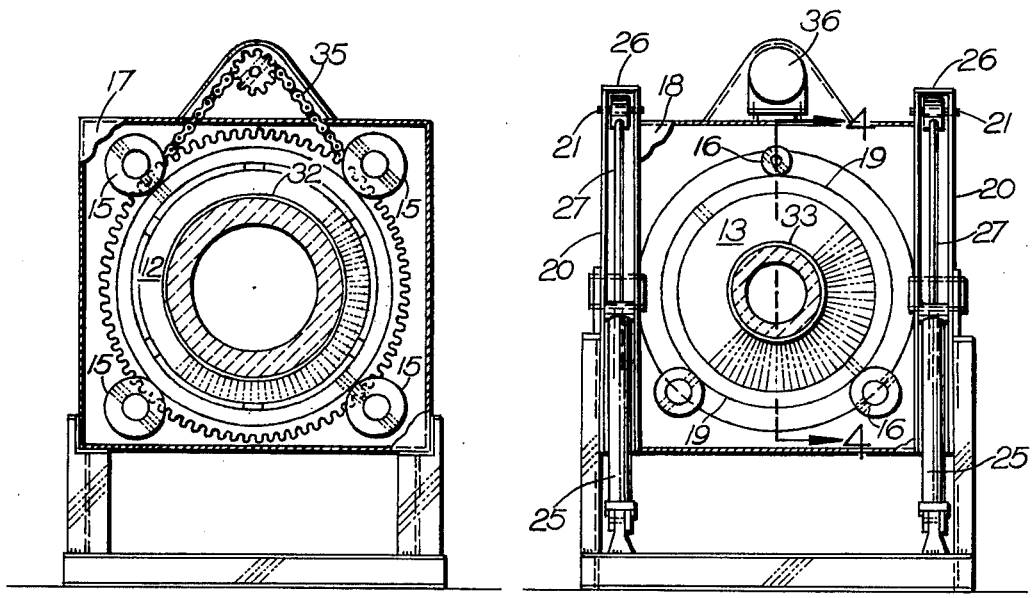
FIGS. 2 and 3 are front and back views of the furnace taken along the lines 2—2 and 3—3, respectively, in FIG. 1.

FIGS. 1-4 illustrate a conventional rotary furnace which is suitable for use with the present invention. The rotary furnace 10 generally comprises a cylindrical metal shell 11 and tapered ends 12 and 13 of frusto-conical shape and is provided with a suitable refractory lining 14. Roller sets 15 and 16 are provided to support the furnace and allow for the rotation thereof. Roller sets 15 and 16 are positioned within housings 17 and 18, respectively, as shown in FIGS. 2 and 3. Frusto-conical end 13 is provided with a peripheral tire 19 which is adapted to ride on roller set 16. Support housings 17 and 18 are affixed to cradle members 20 located on both sides of the furnace 10. The cradles 20 are rotationally fixed at the fulcrum points 21 and supported by members 23 and 24. Hydraulic rams 25 are attached to the upper ends 26 of the cradles 20, and when actuated, arms 27 thereof are pulled into the ram housing and thereby tilt the furnace about the fulcrum point 21. A tilt of about 60° will usually discharge the skim 44 from the furnace 10. A damper plate 30 is provided on hood 31 at the feed end 32 of the furnace and is adapted by suitable means (not shown) to move toward and away from the feed end 32 to thereby control the amount of air which can be drawn into the furnace. A burner 50 is disposed through the hood 31. An exhaust duct (not shown) is usually positioned at the discharge end 33 to direct effluent to suitable treatment facilities. The furnace 10 is rotated about its axis by means of a chain 35 driven by drive motor 36 and chain 36. A tap hole (not shown) is usually disposed through the furnace shell and refractory lining to allow molten metal 45 to be drained from the furnace.

In the operation of the furnace in accordance with the invention, the furnace hood 31 and damper 30 are moved away from the feed end 32 and hot, metal-containing skim is fed into the furnace chamber by suitable means such as a chute. The furnace hood 31 and damper 30 are repositioned adjacent the feed end 32 and furnace rotation is commenced. Due to the tumbling action of the skim 44, the molten aluminum 45 quickly separates from the skim and by controlling the temperatures of the skim within the prescribed range, very little of the molten aluminum is oxidized. The temperature is controlled by adjusting the position of damper 30 which thereby controls the amount of air allowed into the furnace. The furnace rotation is stopped and molten aluminum 45 which separates from the skim is drained from the furnace into a crucible or mold through the tap hole. Preferably, a solid quenchant is then introduced into the furnace chamber in the same manner as the hot skim, and the furnace again rotated to quench the hot, spent skim remaining in the furnace. To discharge the skim 44 after it has cooled, the exhaust duct (not shown) usually must be removed from the furnace end 33 and the hydraulic ram 25 is actuated to tilt the furnace about the fulcrum points 21 at an angle of about 60° from the horizontal.

Figure 4:
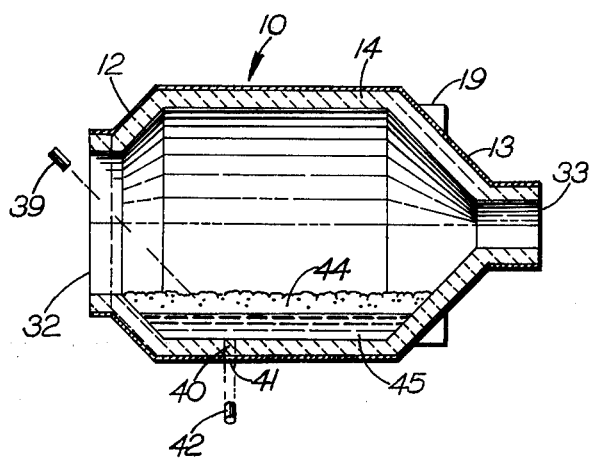
FIG. 4 is a cross-sectional view through the furnace taken along the line 4—4 in FIG. 3. Corresponding parts in the drawings are numbered the same.

The temperature of the skim during the operation of the furnace can be sensed in any convenient fashion. For example, as shown in FIGS. 1 and 4, the skim temperature can be sensed by means of an infrared pyrometer 39 which is positioned to view the skim through the feed end 32. An alternate method is to position an anisotropic, pyrolytic graphite brick 40 at one or more points in the refractory lining. Openings 41 in the furnace shell are provided to expose the back surface of the graphite brick 40, the temperature of which is sensed by means of an infrared pyrometer 42 (or other suitable device) positioned adjacent the furnace. It is preferred to place the anisotropic brick at those locations in the furnace which are subject to the highest temperatures and therefore also subject to build-up. These locations generally are empirically determined.

The position of the damper 30 may be adjusted by any suitable means in accordance with the temperature sensed to increase or decrease the amount of air which is allowed into the interior chamber of the furnace 10 containing the mass of skim. This readily controls the amount of combustion supporting gas in the furnace chamber and thereby controls the oxidation of free metal and the maximum temperature of the skim. Other means can be employed to control the composition of the furnace gases in response to the temperature sensed. For example, the pressure differential between the furnace chamber and the atmosphere can be controlled by conventional, well-known means, such as a draft fan and damper operatively positioned in the exhaust conduit.

The burner 50 is employed on the feed end of the rotary furnace to raise the temperature of skim in the furnace, if necessary, to the desired operating level in accordance with the invention. It can also be used to preheat the furnace to operating temperatures. However, little or no additional heat will be needed to effect the desired skim temperatures if the hot skim which is removed from the molten aluminum surface is quickly transferred to the rotary furnace.

The following example typifies the operation of the present invention. About 2000 pounds of furnace skim having from about 40-60% by weight of molten aluminum entrained therein is removed from a melting furnace containing molten aluminum. The hot skim is placed in a skim bucket and the molten metal which settles to the bottom of the crucible is decanted back to the melting furnace. The amount of metal returned to the furnace is about 300-1000 pounds or about 15-50% of the total weight of skim removed from the furnace. The hot skim in the crucible is then fed to the rotary furnace, and the furnace is rotated at about 20 rpm for about 1-5 minutes to thereby tumble the contents of the furnace and effect metal separation from the skim. The temperature of the skim is controlled to about 1250° ±50° F to facilitate metal separation and yet avoid the rapid oxidation thereof. Furnace rotation is then stopped and molten aluminum (about 500-800 pounds) is drained from the furnace through the tap hole. The total amount of metal recovered is about 70% of the metal in the skim removed from the melting furnace. After the metal is tapped out, about 500 pounds of ⅜-¾ gravel (at room temperature) is added to the furnace, and the resultant mixture of dross and gravel is tumbled within the furnace for about 2 minutes to cool the dross to below 1000° F and to clean the refractory lining. The entire mixture, which usually consists of particles less than 1 inch in maximum diameter, is then discharged from the furnace. The mixture of skim and inert granular material is capable at this point to be used as inert land fill without the need for further treatment to satisfy environmental regulations other than land preparation to meet local requirements. The spent skim will have considerably less than 5% free aluminum (based on the skim only), usually less than 1%.

The above example is given as more or less a composite of many tests of the present invention because there is a wide variation in the amount of metal in the skim removed from the molten aluminum surface and the amount of metal recovered from the skim. Specific examples of individual runs can frequently be misleading or meaningless (recovery either too high or too low) because of the varying physical characteristics of the skim encountered under differing commercial operations.

It is obvious that various modifications and improvements can be made to the present invention without departing from the spirit thereof and the scope of the appended claims.

What is claimed is:

1. An essentially salt-free method of recovering metallic aluminum entrained in molten aluminum-containing skim removed from a molten aluminum surface comprising,
    a. tumbling said aluminum-containing skim in a refractory lined rotary furnace with an essentially halide-free atmosphere, while maintaining the temperature of the skim between 1200° and 1500° F to effect an agglomeration of the molten aluminum entrained in the skim and a separation thereof from the skim;
    b. discharging the separated molten aluminum from the rotary furnace; and then
    c. discharging the essentially aluminum-free skim from the rotary furnace.

2. The method of claim 1 wherein the essentially aluminum-free skim is quickly cooled in the rotary furnace to below 1200° F after the molten aluminum is discharged from the rotary furnace.

3. The method of claim 1 wherein the essentially aluminum-free skim is quickly cooled in the rotary furnace to below 1000° F after the molten aluminum is discharged from the rotary furnace.

4. The method of claim 2 wherein the aluminum-free skim is quickly cooled by adding granular material to the furnace and rotating the furnace.

5. The method of claim 1 wherein the temperature of the skim during the tumbling thereof is controlled between about 1200° and about 1350° F to effect separation of molten aluminum from the skim and to avoid excessive oxidation of metal.

6. The method of claim 1 wherein the temperature of the skim during the tumbling thereof is maintained within the desired range by controlling the amount of combustion supporting gas within the furnace.

7. A method of recovering metallic aluminum from the aluminous skim which forms on the surface of molten aluminum comprising,
    a. removing the aluminous skim from the molten aluminum surface;
    b. holding the aluminuous skim removed from the molten aluminum surface in a suitable crucible to allow molten aluminum therein to settle to the bottom of the crucible;
    c. decanting the settled molten aluminum from the crucible;
    d. feeding the aluminous skim remaining in the crucible to a rotary furnace;
    e. rotating the rotary furnace to cause the tumbling of the aluminous skim therein to effect a separation of molten aluminum from the aluminous skim;
    f. controlling the temperature of the tumbling skim at a temperature between 1200° and 1500° F;
    g. discharging from the furnace the molten aluminum which separates from the aluminous skim;
    h. adding granular material to the aluminous skim remaining in the rotary furnace after the molten aluminum has been discharged to cool the aluminous skim below 1200° F; and
    i. discharging from the rotary furnace the cooled mixture of aluminous skim and the inert granular material.

8. The method of claim 1 wherein the aluminum-containing skim is tumbled in the rotary furnace for about 1-20 minutes.

9. The method of claim 1 wherein the aluminum-containing skim is tumbled in the rotary furnace for about 1-10 minutes.

10. The method of claim 4 wherein the granular material is selected from the group consisting of gravel, limestone, ferro slag and alumina.

11. The method of claim 4 wherein the granular material is less than 2 inches in maximum dimension.

12. The method of claim 4 wherein at least 70% of the granular material is greater than ⅜ but less than ¾ in maximum dimension.

* * * * *

UNITED STATES PATENT AND TRADEMARK OFFICE
CERTIFICATE OF CORRECTION

PATENT NO. : 4,040,820
DATED : August 9, 1977
INVENTOR(S) : James A. Loach and Harold R. Kirby It is certified that error appears in the above—identified patent and that said Letters Patent are hereby corrected as shown below:

```
Column 3, line 34,  "1350°C)." should be --1350°F (649°-732°C).--
Column 4, line 21,  "3/8-3/4" should be --3/8"-3/4"--
Column 7, line 22,  "3/8-3/4" should be --3/8"-3/4"--
Column 8, line 62,  "3/8" should be --3/8"--
Column 8, line 62,  "3/4" should be --3/4"--
```

Signed and Sealed this

Third Day of January 1978

[SEAL]

Attest:

RUTH C. MASON
*Attesting Officer*

LUTRELLE F. PARKER
*Acting Commissioner of Patents and Trademarks*